United States Patent
Muller et al.

(10) Patent No.: US 9,421,804 B2
(45) Date of Patent: Aug. 23, 2016

(54) METHOD AND APPARATUS FOR PRINT CONTROL

(71) Applicant: Hewlett-Packard Development Company, L.P., Houston, TX (US)

(72) Inventors: Andreas Muller, Barcelona (ES); Jacint Humet Pous, Santa Perpetua de Mogoda (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/983,043

(22) Filed: Dec. 29, 2015

(65) Prior Publication Data

US 2016/0129715 A1 May 12, 2016

Related U.S. Application Data

(63) Continuation of application No. 14/417,558, filed as application No. PCT/EP2012/064973 on Jul. 31, 2012, now Pat. No. 9,266,368.

(51) Int. Cl.
| | |
|---|---|
| B41J 2/205 | (2006.01) |
| B41J 29/393 | (2006.01) |
| G06K 15/02 | (2006.01) |
| H04N 1/60 | (2006.01) |
| B41J 2/21 | (2006.01) |
| H04N 1/54 | (2006.01) |

(52) U.S. Cl.
CPC ...... *B41J 29/393* (2013.01); *B41J 2/21* (2013.01); *H04N 1/54* (2013.01); *H04N 1/6019* (2013.01); *H04N 1/6033* (2013.01); *H04N 1/6038* (2013.01)

(58) Field of Classification Search
CPC ..... H04N 1/54; H04N 1/6038; H04N 1/6019; H04N 1/6033; H04N 1/6025; B41J 2/2114; B41J 2/175
USPC ................ 347/6, 14, 15, 19; 358/1.1, 1.2, 1.9
See application file for complete search history.

(56) References Cited

U.S. PATENT DOCUMENTS

| | | | |
|---|---|---|---|
| 6,997,543 | B2 | 2/2006 | DeBaer |
| 7,524,009 | B2 | 4/2009 | Chiwata |
| 7,586,643 | B2 | 9/2009 | Higashikata |
| 7,889,402 | B2 | 2/2011 | Chang et al. |
| 2009/0085952 | A1 | 4/2009 | Yamazaki |
| 2009/0295893 | A1 | 12/2009 | Akiyama et al. |

FOREIGN PATENT DOCUMENTS

| | | |
|---|---|---|
| EP | 1168822 A1 | 1/2002 |
| EP | 1365579 A2 | 11/2003 |
| EP | 1887788 A2 | 2/2008 |

OTHER PUBLICATIONS

"ColorBurst—Relinearization and Profiling Tutorials", ColorBurst RIP 9, SpectralVision Pro v 2.6, CSE, Inc., copyright 2004-2009 < http://www.colorburstrip.com/windows/ColorBurst9LinProfiling.pdf >, 26 pp.

*Primary Examiner* — An Do
(74) *Attorney, Agent, or Firm* — Michael A. Dryja

(57) ABSTRACT

Embodiments of the present invention provide a method for use in a printing device, comprising outputting a test chart comprising a plurality of printed regions at respective ink densities, receiving an indication of a selected ink density, and determining one or more resources of the printing device according to the selected ink density to control one or more ink limits and a color separation of the printing device.

20 Claims, 3 Drawing Sheets

METHOD AND APPARATUS FOR PRINT CONTROL

BACKGROUND

When printing onto a print media, particularly with liquid ink, controlling properties of the ink applied to the media are important to ensure a quality of the printing. In particular, it is important to control an amount of ink applied to the media. If too much ink is applied to the media during printing then proper drying of the ink may not occur.

In particular, it is important to control the amount of ink applied to media of different types to ensure that the amount of ink applied is within a drying capability of the printer for particular printing conditions. Furthermore it is important to control the amount of ink applied to the media without degrading a quality of the print, such as loosing gamut.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Embodiments of the invention control a limit of ink applied to a print media during printing by a printing device. For print devices which apply a liquid ink to the print media during printing such as, although not limited to, inks containing a polymer dispersed in an aqueous liquid, it is important to ensure proper drying of the ink during the printing process. In the case of inks containing the polymer, polymer layer formation can only occur if substantially all water and solvents have been removed from the print media before reaching a curing temperature. Therefore it is important to ensure the amount of ink applied to the media during printing does not exceed a drying capability of the printing device.

Embodiments of the invention control one or more ink limits and a colour separation of the printing device to ensure drying of the ink without affecting other aspects of the print quality. Some embodiments of the invention further control an amount of a pre-treatment substance applied to the print media prior to application of the ink. The pre-treatment substance may be used to control a dot gain of the ink applied to the media. The amount of pre-treatment can cause print defects such as a mixing of adjacent colours or desaturated areas at a border of a colour area.

Figure 1:
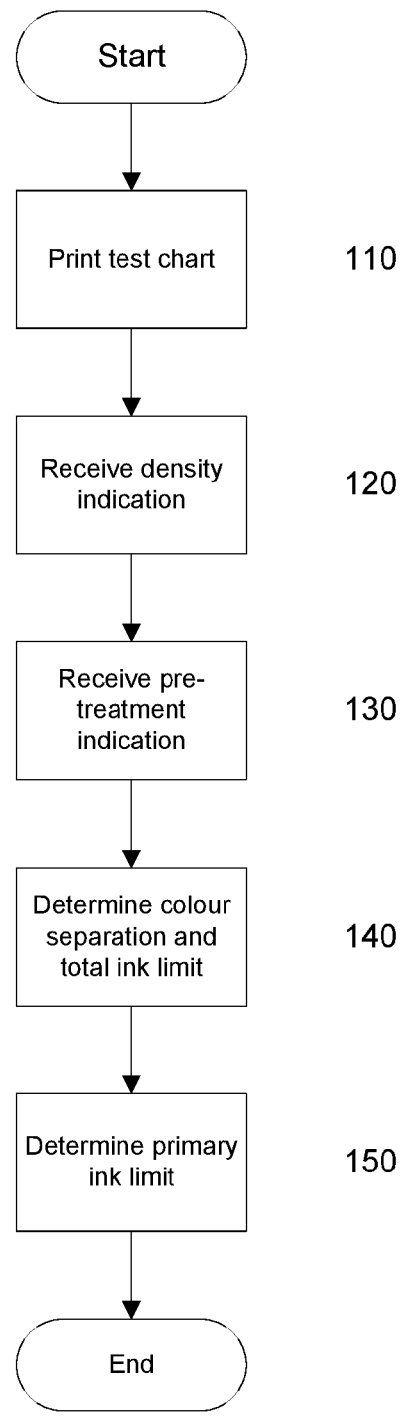
FIG. 1 shows a method according to an embodiment of the present invention.

FIG. 1 illustrates a method 100 according to an embodiment of the invention.

In step 110 a test chart is output by a printing device. The test chart comprises a plurality of regions or areas printed at different ink densities. In particular, the test chart comprises a plurality of regions printed at successively increasing ink densities. The test chart is printed onto a print media.

Figure 2:
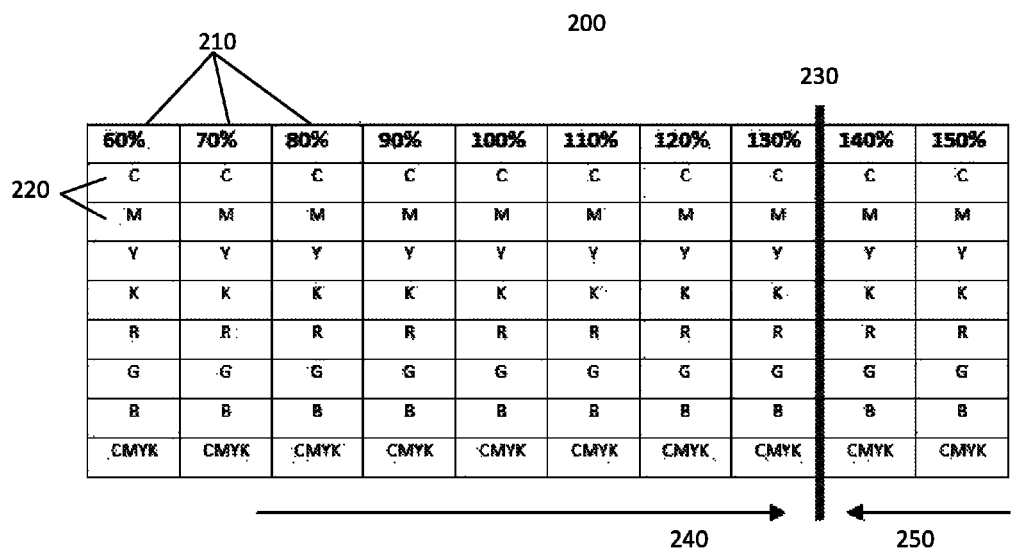
FIG. 2 shows a test chart according to an embodiment of the invention.

An embodiment of a test chart is shown in FIG. 2. The test chart 200 comprises the plurality of regions printed at different ink densities. In the embodiment shown in FIG. 2 the regions are columns 210, not all of which are indicated for clarity. Each column 210 is printed at a respective ink density. The ink density of the columns 210 increases successively, from left to right of the test chart shown in FIG. 2. In the embodiment shown, the ink density of the columns 210 increases in increments of 10% beginning from a minimum ink density, which in the example of FIG. 2 is 60%. Each column 210 is printed having a total and primary ink limits set according to the respective ink density.

In some embodiments, the test chart 200 is printed using a pre-treatment level applied to the print media prior to printing which is expressed as a percentage of the total ink limit. Therefore the regions in each column 210 have a different absolute amount of pre-treatment applied to the media prior to printing, owing to the higher ink limit for columns having a higher ink density, whilst the whole chart 200 has the same pre-treatment level applied. Two or more test charts 200 may be printed having different pre-treatment levels. The two or more test charts 200 may be printed in step 110 by combining several charts 200 having different pre-treatment levels.

Each column 210 comprises a plurality of sub-regions 220, not all of which are indicated for clarity. In embodiments of the invention for a colour printing device, the sub-regions are each printed to have a different colour. A first plurality of the sub-regions 220 may be printed in each process ink colour of the printing device, such as each of CMYK. A second plurality of the sub-regions are printed, in some embodiments, in the colours RGB. It will be realised that embodiments of the invention may print sub-regions having different colours. A further region may correspond to a combination of all of the inks of the printing device. Each column may comprise a label indicating the respective ink density of the column for the user's information.

When the test chart 200 is printed a boundary 230 will exist between a region printed at an ink density below an ink drying threshold of the printing device and print media and a successive region above the ink drying threshold. The region above the ink drying threshold will exhibit characteristics of insufficient drying, such as improper curing of a polymer ink. Thus the boundary 230 is not part of the test chart 200, but is a boundary between a region of sufficient drying 240 and insufficient drying 250 of the ink observed by the user. The ink densities below the boundary 230 are ink densities capable of being printed by the printing device without curing or drying defects, although to maximise a gamut for the printing conditions the ink density immediately below the boundary 230 is preferably used. Furthermore, in embodiments of the invention wherein two or more test charts are printed at different pre-treatment levels, an optimal pre-treatment level may be determined by observing borders between different colour regions within each test chart 200. The test chart printed at the optimal pre-treatment level will have a minimal amount of artefacts between the regions. Furthermore, the colour regions should appear smooth and uniform at the optimal pre-treatment level.

In step 120 the printing device receives an indication of the location of the boundary 230. The indication is provided by the user having observed the output test chart 200. The printing device may receive the indication via an interface of the printer itself, such as via one or more buttons of the printer, or the indication may be received via a software program associated with the printer which is being executed by a computing device communicably coupled to the printer.

In some embodiments, in step 130 the printing device receives an indication of the location of the boundary 230 and the test chart 200 from amongst the plurality of test charts having the optimal pre-treatment level.

Figure 3:
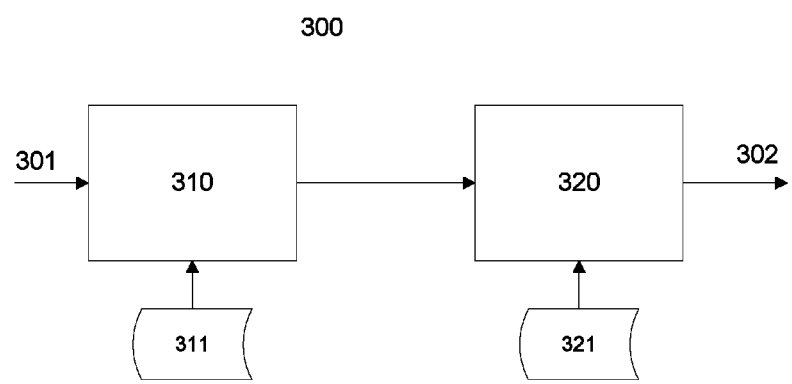
FIG. 3 shows an apparatus according to an embodiment of the invention.

FIG. 3 illustrates a colour pipeline 300 of a contone printing device according to an embodiment of the invention.

The colour pipeline 300 transforms received print data 301 from an input colour space to a printer colour space 302. The colour pipeline 300 comprises a colour space convertor 310 and a linearizer 320. The colour space convertor (CSC) 310 controls colour separation and a total ink limit of the print data. The linearizer 320 controls primary ink limits of the print data.

The input colour space of the received print data 301 may be RGB or CMYK having an associated number of bits-per-pixel (bpp), such as 8 bpp. The printer colour space comprises N-channels where N is the number of inks in the printing device. The printing device may be a light dye load printing device such as a CMYKcm printing device which comprises light dye load colourants light cyan (c) and light magenta (m). Light dye load printing devices typically comprise more than four colourants.

The number of bits used to represent the input colour space may be less than or equal to the number of bits used to represent the printer colour space. In some embodiments, the printer colour space data has 12 bpp. Furthermore, in some embodiments of the invention the printing device comprises a pre-treatment fluid which is applied to the print media and the application of the pre-treatment may be handled in a similar way to the colourants and thus the printing device may be a CMYKcmP printing device wherein P is the pre-treatment.

The colour pipeline 300 utilises colour resources 311, 321 which are data used by the colour pipeline 300 to transform the input data 301 from the input colour space to the printer colour space of the output data 302. The colour resources comprise a colour space look-up table (LUT) 311 and a plurality of linearization LUTs 312, as will be explained.

The colour space LUT 311 defines the ink usage of each ink. In embodiments of the invention the LUT 311 converts from 8-bit RGB or CMYK data to 8-bit N-channel data, where N is the number of inks or fluids of the printing device. Thus the respective amount of each ink applied to the print media for a given input colour is controlled by the colour space look-up table 311.

In some embodiments of the invention the colour separations are related to the amount of pre-treatment applied to the media. Thus colour separations may be controlled according to the amount of pre-treatment applied to the print media. Furthermore, for light and dark ink usage, such as C and c, colour separations may be controlled depending on a maximum amount of ink of these colours. For example, for low ink densities an amount of light ink usage is controlled to be lower.

The colour space LUT 311 further defines a total ink limit which controls a maximum amount of all inks that is applied to the print media.

In some embodiments of the invention the colour space LUT 311 allows the colour separation and total ink limit to be controlled in step 140 according to the ink density selection received in step 120. The LUT 311 provides conversion from 8 bit CMYK input data 301 to 8 bit or more N channel output data 302, such as CMYKcmP data.

In some embodiments the LUT comprises 9 nodes for each input channel giving $9^4$ entries. The colour space LUT 311 comprises colour separations and total ink limits pre-computed for different ink densities and pre-treatment levels which are selected according to the inputs received in steps 120 and 130.

Ink limits may be expressed as a volume or weight of ink per unit area of the print media, for example $ml/m^{-2}$ or $g/m^{-2}$. The ink limits can also be expressed in terms of a number of ink drops per print cell, such as 2.5 drops/600 dpi cell, or can also be expressed as a percentage of the maximum amount of ink of a single ink, for example 300% meaning 3 times the maximum amount of ink applied for a single colour. In embodiments of the invention, the ink densities are expressed also as percentages of a nominal condition, for example if 100% refers to a 4 drop total ink limit then 80% ink density refers to 3.2 drops.

The linearization LUTs 321 define the maximum amount of each ink applied to the print media (primary ink limit) and control the application of each ink according to a channel value, for example to control the ink amount to be linear in perception to the viewer. Since the linearization tables 321 control the application of each ink, one of the plurality of linearization tables LUTs 312 are selected according to the ink density received in step 120. In some embodiments, one of the linearization LUTs 312 may be selected in response to the pre-treatment selected in step 130 rather than the colour separations. Thus one of a plurality of linearization LUTs 312 is selected in step 150 from amongst a plurality of linearization LUTs pre-computed for different combinations of ink density and pre-treatment levels.

Figure 4:
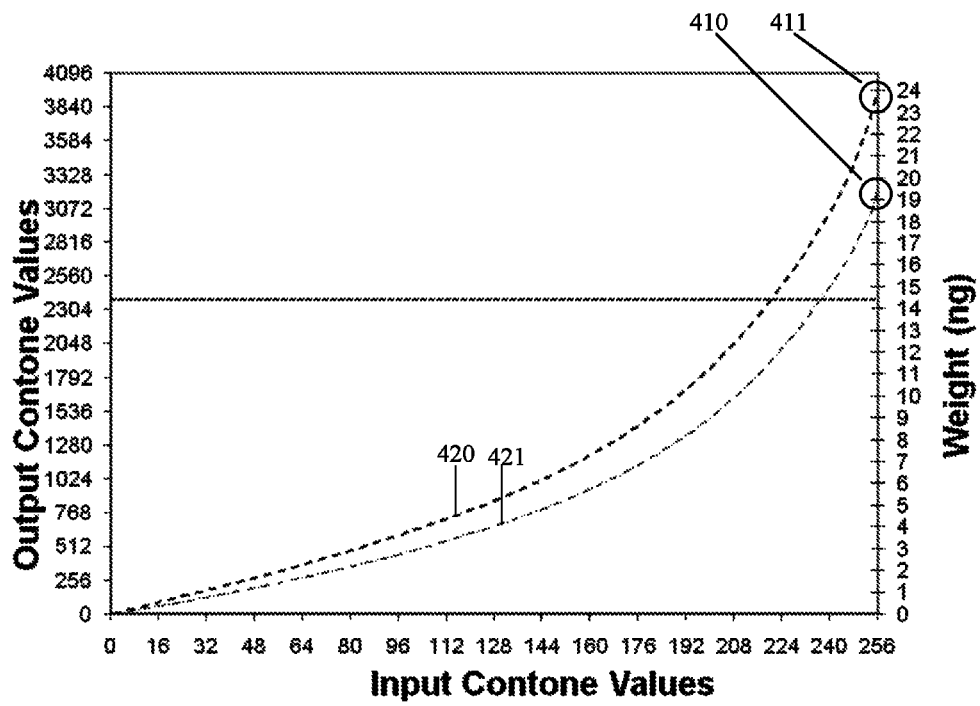
FIG. 4 is an illustration of linearization data according to an embodiment of the invention.

FIG. 4 illustrates an operation of a linearization table 321 on a contone print value 302 received from the colour pipeline 300. Reference numerals 410, 411 indicate a change in primary ink limit applied to the input colour data 302 illustrating a change in output print value according to the primary ink limit. Reference numerals 420, 421 indicate a change in linearity of a conversion from input to output contone values for a specific ink density.

Figure 5:
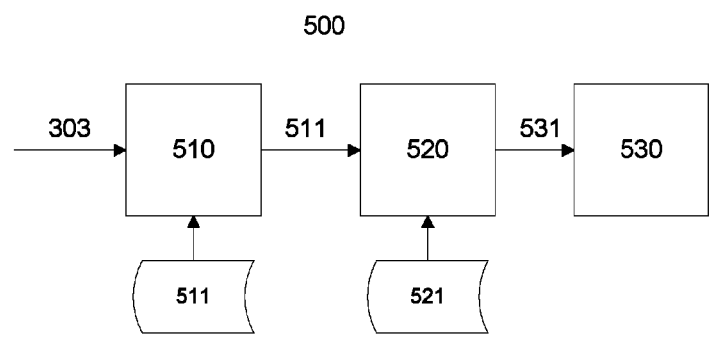
FIG. 5 shows an apparatus according to a further embodiment of the invention.

FIG. 5 illustrates a writing system (WS) pipeline 500 of the printing device according to an embodiment of the invention. The WS pipeline 500 receives the print data 302 output by the colour pipeline 300. The WS pipeline 500 converts the received print data 302 from the printer colour space to 1 or 2 bit N-channel colour space, where N is the number of inks of the printing device. The WS pipeline 500 also controls the primary and total ink limits of the printing device. The WS pipeline 500 converts image data to dots on the print media and, thus, WS pipeline resources 511, 521 may be controlled according to the received ink density and pre-treatment level indications in steps 120, 130.

The WS pipeline 500 comprises a halftone module 510 and a masking module 520. The WS pipeline 500 provides print data 521 to a print unit 530 for printing on the print media.

The halftone module 510 receives the contone print data 302 from the colour pipeline 300 and uses halftone tables 511 to convert the print data 302 to halftone levels which are output as halftone print data 511. The halftone levels may be defined by a predetermined number of bits per pixel, such as 2 bpp, to give 4 halftone levels although it will be realised that other numbers of halftone levels may be utilised.

The masking module 520 receives the halftone print data 511 and uses masking resources 521 to convert the print data 511 to a number of drops per pixel. In a multi-pass printing mode the masking module 520 also determines a drop sequence defining on which pass each drop is fired.

In embodiments of the invention the ink limits and pre-treatment level applied to the print media may be controlled by selecting the halftone data in the halftone table 511 and masking resources 521 according to the ink density value received in step 120.

In some embodiments, a drop sequence for the pre-treatment may also be controlled in response to the pre-treatment value received in step 130. The drop sequence is controlled in embodiments of the invention by selecting one of a plurality of masks for each colourant, and also the pre-treatment in some embodiments of the invention. For example, where the colour resources 311, 312 have been computed for a drop sequence of 1-2-3, changing the drop sequence to 2-4-6 multiplies the amount of colourant or pre-treatment by a factor of 2. Thus the ink limits may be controlled by selecting one of a plurality of masks to control the drop sequence of the fluid onto the media.

It will be appreciated that embodiments of the invention allow the colour separations and one or more ink limits of a printing device to be controlled in response to a received indication of an ink density having optimal drying characteristics and, in some embodiments, also an optimal pre-treatment level.

Embodiments of the invention allow a colour separation and ink limits of a printing device to be controlled without the use of a software RIP executed by a computing device associated with the printing device. The control of the colour separation and ink limit in response to an indication of a region having a suitable ink density printed under realistic printing conditions, such as on a desired print media, allows accurate control of printing parameters for the printing conditions.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method comprising:
outputting, by a printing device, a pretreatment fluid on a medium;
printing, by the printing device, a test chart on the medium on which the pretreatment fluid has been output, the test chart comprising a plurality of regions at respective ink densities;
determining a boundary between the regions at which insufficient ink drying has occurred and the regions at which sufficient ink drying has occurred; and
when outputting ink to form an image by the printing device, using an ink density corresponding to the region immediately below the boundary.

2. The method of claim 1, wherein determining the boundary comprises receiving user specification as to the boundary.

3. The method of claim 1, wherein the regions are of a same ink color.

4. The method of claim 1, wherein the regions comprise:
a plurality of first regions at the respective ink densities of a first ink color; and
a plurality of second regions at the respective ink densities of a second ink color.

5. The method of claim 1, wherein using the ink density corresponding to the region immediately below the boundary comprises:
determining a linearization table corresponding to a combination of a pretreatment level of the pretreatment fluid output on the medium and the ink density corresponding to the region immediately below the boundary,
wherein the linearization table controls ink limits and color separation of the printing device.

6. The method of claim 5, wherein the ink limits comprise a total ink limit of the printing device.

7. The method of claim 1, wherein using the ink density corresponding to the region immediately below the boundary comprises:
selecting ink limits and color separation from a look-up table according to the ink density corresponding to the region immediately below the boundary.

8. A non-transitory computer-readable data storage medium storing a computer program executable by a processor to perform a method comprising:
causing a printing device to output a pretreatment fluid at respective pretreatment levels on one or more media;
causing the printing device to print a plurality of test charts corresponding to the respective pretreatment levels on the media on which the pretreatment fluid has been output, each test chart comprising a plurality of regions at respective ink densities;
determining the test chart having an optimal pretreatment level, as a selected test chart;
determining a boundary between the regions at which insufficient ink drying has occurred and the regions at which sufficient ink drying has occurred with respect to the selected test chart; and
when causing the printing device to form an image by outputting ink, causing the printing device to use the optimal pretreatment level and an ink density corresponding to the region immediately below the boundary on the selected test chart.

9. The non-transitory computer-readable data storage medium of claim 8, wherein determining the test chart having the optimal pretreatment level comprises receiving user specification as to the selected test chart.

10. The non-transitory computer-readable data storage medium of claim 8, wherein determining the boundary with respect to the selected test chart comprises receiving user specification as to the boundary.

11. The non-transitory computer-readable data storage medium of claim 8, wherein causing the printing device to use the optimal pretreatment level and the ink density corresponding to the region immediately below the boundary on the selected test chart comprises:
- determining a linearization table corresponding to a combination of the optimal pretreatment level of the pretreatment level of the pretreatment fluid and the ink density corresponding to the region immediately below the boundary,
- wherein the linearization table controls ink limits and color separation of the printing device.

12. The non-transitory computer-readable data storage medium of claim 11, wherein the ink limits comprise a total ink limit of the printing device.

13. The non-transitory computer-readable data storage medium of claim 8, wherein causing the printing device to use the optimal pretreatment level and the ink density corresponding to the region immediately below the boundary on the selected test chart comprises:
- selecting ink limits and color separation from a look-up table according to the optimal pretreatment level and the ink density corresponding to the region immediately below the boundary.

14. A printing system comprising:
- a printing mechanism to output pretreatment fluid and ink on one or more media;
- a controller implemented at least by hardware including a processor and that is to:
  - cause the printing mechanism to output a pretreatment fluid on the media;
  - cause the printing mechanism to output a test chart on the medium on which the pretreatment fluid has been output, the test chart comprising a plurality of regions at respective ink densities;
  - determine a boundary between the regions at which insufficient ink drying has occurred and the regions at which sufficient ink drying has occurred; and
  - when causing the printing mechanism to form an image by outputting ink, cause the printing mechanism to use an ink density corresponding to the region immediately below the boundary.

15. The printing system of claim 14, wherein the controller is to cause the printing mechanism to use the ink density corresponding to the region immediately below the boundary by:
- determining a linearization table corresponding to a combination of a pretreatment level of the pretreatment fluid output on the medium and the ink density corresponding to the region immediately below the boundary,
- wherein the linearization table controls ink limits and color separation of the printing device.

16. The printing system of claim 14, wherein the controller is to cause the printing mechanism to use the ink density corresponding to the region immediately below the boundary by:
- selecting ink limits and color separation from a look-up table according to the ink density corresponding to the region immediately below the boundary.

17. The printing system of claim 14, wherein the controller is to cause the printing mechanism to output the pretreatment fluid on the media by causing the printing device to output the pretreatment fluid at respective pretreatment levels on the media,
and wherein the controller is to cause the printing mechanism to output the test chart on the medium on which the pretreatment fluid has been output by causing the printing device to output a plurality of test charts corresponding to the respective pretreatment levels on the medium on which the pretreatment fluid has been output, each test chart comprising a plurality of regions at the respective ink densities.

18. The printing system of claim 17, wherein the controller is further to:
- determining a selected test chart of the plurality of test charts having an optimal pretreatment level,
- wherein the controller is to determine the boundary between the regions at which the insufficient ink drying has occurred and the regions at which sufficient ink drying has occurred with respect to the selected test chart,
- and wherein the controller is to, when causing the printing mechanism to form the image by outputting the ink, cause the printing mechanism to use the optimal pretreatment level as well as the ink density corresponding to the region immediately below the boundary on the selected test chart.

19. The printing system of claim 18, wherein the controller is to cause the printing mechanism to use the optimal pretreatment level as well as the ink density corresponding to the region immediately below the boundary on the selected test chart by:
- determining a linearization table corresponding to a combination of the optimal pretreatment level of the pretreatment level of the pretreatment fluid and the ink density corresponding to the region immediately below the boundary,
- wherein the linearization table controls ink limits and color separation of the printing device.

20. The printing system of claim 18, wherein the controller is to cause the printing mechanism to use the optimal pretreatment level as well as the ink density corresponding to the region immediately below the boundary on the selected test chart by:
- selecting ink limits and color separation from a look-up table according to the optimal pretreatment level and the ink density corresponding to the region immediately below the boundary.

* * * * *